UNITED STATES PATENT OFFICE.

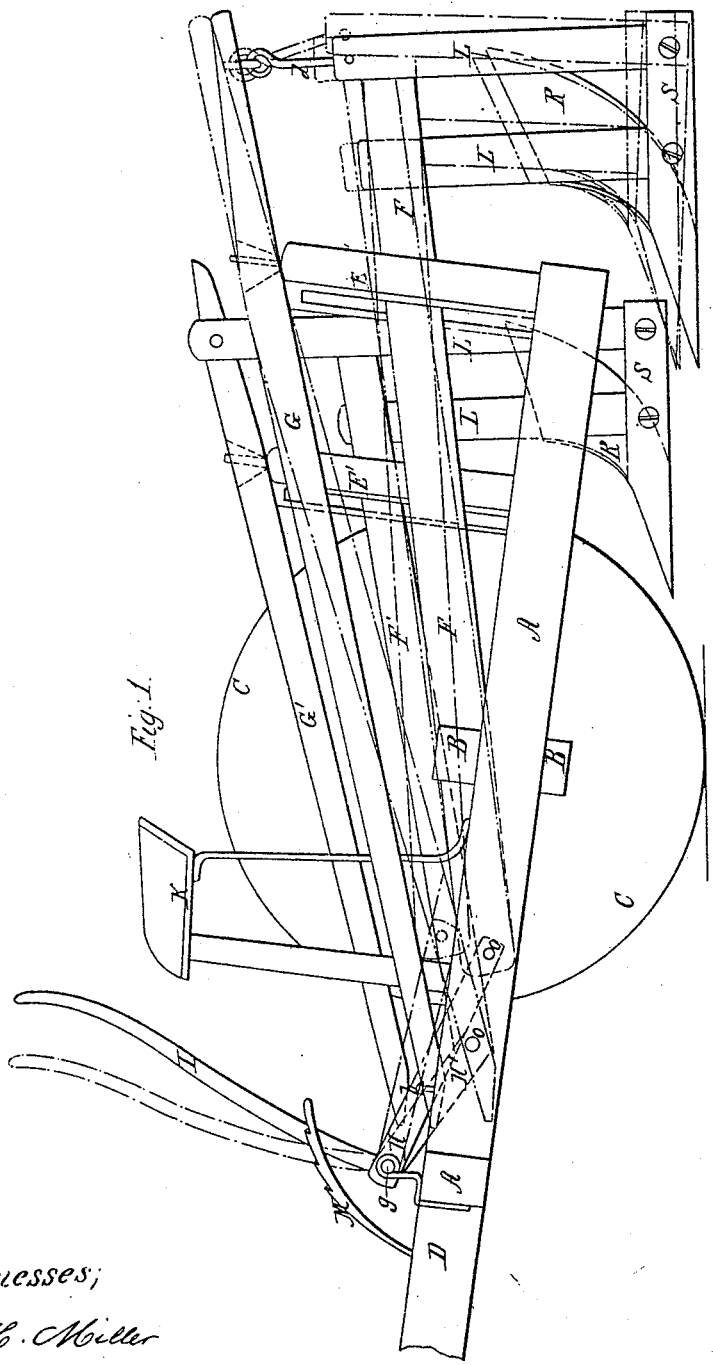

WM. H. FREEMAN, OF BLOOMFIELD, IOWA.

IMPROVEMENT IN GANG-PLOWS.

Specification forming part of Letters Patent No. 45,988, dated January 24, 1865.

*To all whom it may concern:*

Be it known that I, WM. H. FREEMAN, of Bloomfield, in the county of Davis and State of Iowa, have invented certain new and useful Improvements in Plows; and I do hereby declare that the following is a full, clear, and exact description of the construction and operation of the same, reference being had to the accompanying drawings, in which—

Figure 1 represents a side view of the plow, one of the supporting-wheels having been removed to show the parts behind.

My invention relates to the combination and arrangement of adjustable plow-beams within the frame of the machine, whereby the driver from his seat can regulate the depth of the plows as well as their inclination or pitch.

This machine is particularly adapted to be used by such persons who have been bodily disabled, and are thus prevented from plowing with a hand-plow.

To enable others skilled in the art to make and use my invention, I will proceed to describe its construction and operation.

A represents the main frame of the plow, which is secured to the axle B and is supported on the wheels C. The tongue or pole D is rigidly secured to it.

E and E' represent yokes within which the plow-beams play when they are raised or lowered. They are parts of the frame A and are rigidly secured thereto.

F and F' represent the plow-beams. Their rear ends are suspended by links $d$ or otherwise to the levers G and G', which are supported at their fulcra by the yokes E and E' and can be turned on them to raise or depress the rear ends of the plow-beams by operating their long lever-arms, whose front ends can be secured to hooks $b$ to hold them and the plow-beams stationary.

The front ends of the plow-beams F' F' are hinged at $c$ to the lever-arms H H' of the shaft $g$, which are operated by the driver by means of the hand-lever I.

L represents the plow-stocks that are secured to the rear ends of the plow-beams F F', and the mold-boards R and landsides S are secured to the said stocks.

M represents a toothed arc, into which the lever I can be sprung to retain it and the plow-beams in any desired position.

From the above it will be seen that the driver on his seat K can raise or depress the long arms of the levers G so as to raise the plows or to lift them out of the ground, and suitable standards may be applied to the main frame to secure the levers G at any desired position. The position shown in red lines on the drawings shows the parts when the plow is raised by operating lever G.

By operating the lever I the driver on his seat can adjust the inclination or dip of the plow so as to cause the plow to run at a certain depth. This in hand-plowing is a very laborious operation, and a man laboring under a bodily disability is entirely unable to perform the same. The lever I being within easy reach from the driver's seat, the operator, by turning the same from or toward his body, easily adjusts the dip of two or more plows with the greatest facility. The change in the position of the several parts to show the dip of the plow is represented on the drawings in blue lines.

The operator, by means of the levers and adjustments above described, is also enabled to run one plow only, and when moving the plow the plowshares can be raised so as to clear the ground.

Having thus fully described the nature of my invention, what I claim herein as new, and desire to secure by Letters Patent, is—

In combination with the stationary frame A, the hinged plow beam or beams F, and levers G, I, and H, for the purpose of adjusting the height as well as the inclination of the plows, substantially in the manner and for the purposes described.

WM. H. FREEMAN.

Witnesses:
   J. VON ACHEN,
   H. H. TRIMBLE.